(12) United States Patent
He (10) Patent No.: US 12,034,664 B2
(45) Date of Patent: Jul. 9, 2024

(54) METHOD AND APPARATUS FOR INDICATING REFERENCE SIGNAL, TERMINAL, AND NETWORK DEVICE (71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 376 days.

(21) Appl. No.: 17/455,650

(22) Filed: Nov. 18, 2021

(65) Prior Publication Data

US 2022/0077987 A1   Mar. 10, 2022

Related U.S. Application Data (63) Continuation of application No. PCT/CN2019/091408, filed on Jun. 14, 2019.

(51) Int. Cl.
*H04L 5/00* (2006.01)
*H04L 7/00* (2006.01)
*H04L 43/08* (2022.01)

(52) U.S. Cl.
CPC .......... *H04L 5/0048* (2013.01); *H04L 7/0008* (2013.01); *H04L 43/08* (2013.01)

(58) Field of Classification Search
CPC ..... H04L 5/0048; H04L 7/0008; H04L 43/08; H04L 5/0023; H04L 5/0091
See application file for complete search history.

(56) References Cited

U.S. PATENT DOCUMENTS

2020/0178341 A1* 6/2020 Zhang ................... H04W 28/04

FOREIGN PATENT DOCUMENTS

| CN | 107547187 A | 1/2018 |
| CN | 107888266 A | 4/2018 |
| CN | 108092754 A | 5/2018 |
| CN | 108365939 A | 8/2018 |
| CN | 108401533 A | 8/2018 |
| CN | 109150446 A | 1/2019 |
| CN | 109565432 A | 4/2019 |
| WO | 2019029378 A1 | 2/2019 |

(Continued)

OTHER PUBLICATIONS

Extended European Search Report for European Application No. 19932574.7 Apr. 5, 2022. 8 pages.

(Continued)

*Primary Examiner* — Dady Chery
(74) *Attorney, Agent, or Firm* — Perkins Coie LLP (57) ABSTRACT

Implementations of the present disclosure provide a method and apparatus for indicating a reference signal, a terminal, and a network device. The method includes: the terminal receives first configuration information, wherein the first configuration information includes first indication information, the first indication information is used for indicating the reference signal for use in link quality measurement, and the first indication information is first index information representing a transmitting position of the reference signal or second index information representing a OCL relationship of the reference signal.

17 Claims, 7 Drawing Sheets

(56) References Cited

FOREIGN PATENT DOCUMENTS

| WO | 2019047228 A1 | 3/2019 |
| WO | 2019066618 A1 | 4/2019 |
| WO | 2019074702 A1 | 4/2019 |

OTHER PUBLICATIONS

3GPP TS 38.213 V15.2.0 (Jun. 2018)—3rd Generation Partnership Project; Technical Specification Group Radio Access Network; NR; Physical layer procedures for control (Release 15) (99 pages).
3GPP TS 38.331 V15.2.1 (Jun. 2018)—3rd Generation Partnership Project; Technical Specification Group Radio Access Network; NR; Radio Resource Control (RRC) protocol specification (Release 15) (303 pages).
International Search Report issued Mar. 6, 2020 of PCT /CN2019/ 091408 (4 pages).
First Office Action for Chinese Application No. 202111683470.9 issued Feb. 24, 2023. 14 pages with English translation.

\* cited by examiner

A network device sends first configuration information and a terminal receives the first configuration information, the first configuration information including first indication information, the first indication information being used for indicating the reference signal for link quality measurement, wherein the first indication information is first index information representing a sending position of the reference signal or second index information representing a QCL relationship of the reference signal — 601

METHOD AND APPARATUS FOR INDICATING REFERENCE SIGNAL, TERMINAL, AND NETWORK DEVICE

CROSS-REFERENCE TO RELATED APPLICATION

This application is a continuation application of International Application No. PCT/CN2019/091408 filed on Jun. 14, 2019, of which the entire disclosure is hereby incorporated by reference.

TECHNICAL FIELD

Implementations of the present disclosure relate to the technical field of mobile communications, and more particularly, to a method and device for indicating a reference signal, a terminal and a network device.

BACKGROUND

In New Radio (NR), a reference signal configured by a network side for link monitoring and measurement has beam information. When the reference signal is a synchronization signal/PBCH block (SSB), the SSB is identified by an SSB index, which also represents the beam information associated with the SSB. In the NR, the SSB index is carried in the SSB, and the SSBs with different SSB indexes do not have a quasi-co-located (QCL) relationship, that is, the QCL relationship of the SSBs can be obtained through the SSB indexes. In New Radio Unlicensed (NR-U), an SSB position index is carried in an SSB, but the QCL relationship of the SSBs is obtained by SSB QCL indexes, which are not directly carried in the SSBs. In the NR-U, when the SSB is used as the reference signal for link monitoring and measurement, meaning of an identifier of the SSB has changed, so the identifier for indicating the SSB needs to be redefined.

SUMMARY

Implementations of the present disclosure provide a method and device for indicating a reference signal, a terminal and a network device.

A method for indicating a reference signal provided by an implementation of the present disclosure includes: a terminal receives first configuration information including first indication information, the first indication information being used for indicating the reference signal for link quality measurement, wherein the first indication information is first index information representing a sending position of the reference signal or second index information representing a QCL relationship of the reference signal.

A method for indicating a reference signal provided by an implementation of the present disclosure includes: a network device sends first configuration information including first indication information, the first indication information being used for indicating the reference signal for link quality measurement, wherein the first indication information is first index information representing a sending position of the reference signal or second index information representing a QCL relationship of the reference signal.

A device for indicating a reference signal provided by an implementation of the present disclosure includes: a receiving unit configured to receive first configuration information including first indication information, the first indication information being used for indicating the reference signal for link quality measurement, wherein the first indication information is first index information representing a sending position of the reference signal or second index information representing a QCL relationship of the reference signal.

A device for indicating a reference signal provided by an implementation of the present disclosure includes: a sending unit configured to send first configuration information including first indication information, the first indication information being used for indicating the reference signal for link quality measurement, wherein the first indication information is first index information representing a sending position of the reference signal or second index information representing a QCL relationship of the reference signal.

A terminal provided by an implementation of the present disclosure includes a processor and a memory. The memory is configured to store a computer program, and the processor is configured to invoke and run the computer program stored in the memory to perform the method for indicating the reference signal described above.

A network device provided by an implementation of the present disclosure includes a processor and a memory. The memory is configured to store a computer program, and the processor is configured to invoke and run the computer program stored in the memory to perform the method for indicating the reference signal described above.

A chip provided by an implementation of the present disclosure is configured to implement the methods for indicating the reference signal described above.

Specifically, the chip includes a processor configured to invoke and run a computer program from a memory, to enable a device having the chip installed thereon to implement the methods for indicating the reference signal described above.

A computer readable storage medium provided by an implementation of the present disclosure is configured to store a computer program that enables a computer to implement the methods for indicating the reference signal described above.

A computer program product provided by an implementation of the present disclosure includes computer program instructions that enable a computer to implement the methods for indicating the reference signal described above.

A computer program provided by an implementation of the present disclosure, when running on a computer, enables the computer to implement the methods for indicating the reference signal described above.

BRIEF DESCRIPTION OF DRAWINGS

The accompanying drawings described herein are intended to provide a further understanding of the present disclosure and form a portion of the present disclosure. The schematic implementations of the present disclosure and their description are intended to explain the present disclosure and not constitute an improper limitation to the present disclosure. In the accompanying drawings.

DETAILED DESCRIPTION

Technical schemes in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical schemes of the implementations of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
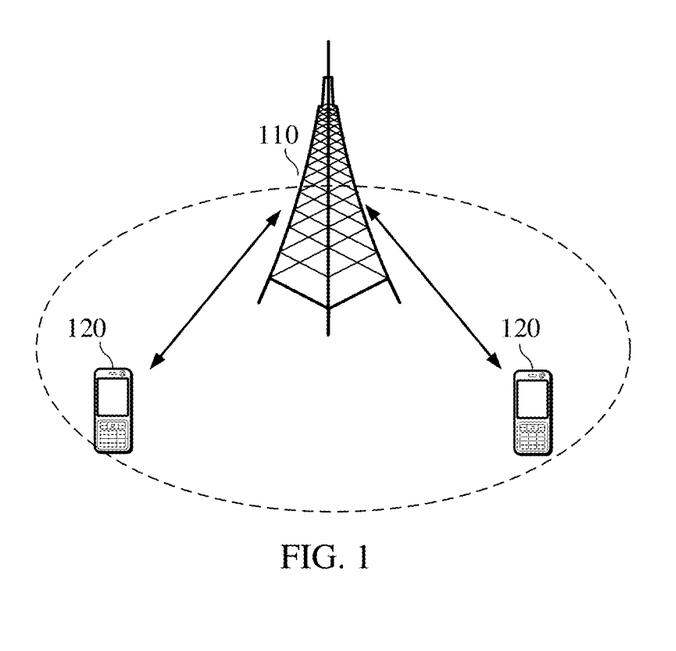
FIG. 1 is a schematic diagram of an architecture of a communication system in accordance with an implementation of the present disclosure.

Illustratively, a communication system 100 applied in the implementations of the present disclosure is shown in FIG. 1. The communication system 100 may include a network device 110, which may be a device that communicates with terminals 120 (or referred to as communication terminals, or terminals). The network device 110 may provide communication coverage for a specific geographical area, and may communicate with terminals located within the coverage area. Optionally, the network device 110 may be a base transceiver station (BTS) in a GSM system or CDMA system, or a NodeB (NB) in a WCDMA system, or an Evolutional Node B (eNB or eNodeB) in an LTE system, or a radio controller in a cloud radio access network (CRAN). Or the network device may be a mobile switching center, a relay station, an access point, a vehicle-mounted device, a wearable device, a hub, a switch, a bridge, a router, a network side device in a 5G network, or a network device in a future evolved public land mobile network (PLMN).

The communication system 100 further includes at least one terminal 120 located within the coverage area of the network device 110. The "terminal" as used herein includes, but is not limited to, a device configured to receive/send communication signals via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or another terminal; and/or an Internet of Things (IOT) device. A terminal configured to communicate via a wireless interface may be referred to as "a wireless communication terminal", "a wireless terminal" or "a mobile terminal". Examples of the mobile terminal include, but are not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, and/or a Global Positioning System (GPS) receiver; and a conventional laptop and/or palmtop receiver or other electronic devices including a radio phone transceiver. The terminal may refer to an access terminal, a user equipment (UE), a subscriber unit, a subscriber station, a mobile site, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal in a 5G network, or a terminal in a future evolved Public Land Mobile Network (PLMN).

Optionally, device to device (D2D) communication may be performed between the terminals 120.

Optionally, the 5G system or 5G network may be referred to as a new radio (NR) system or a NR network.

FIG. 1 illustrates exemplarily one network device and two terminals. Optionally, the communication system 100 may include multiple network devices, and other numbers of terminals may be included within the coverage area of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminals 120 which have communication functions, and the network device 110 and the terminals 120 may be the specific devices described above, and will not be described repeatedly herein. The communication device may further include other devices in the communication system 100, for example other network entities, such as network controllers and mobile management entities, which is not limited in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

In order to facilitate understanding of the technical schemes of the implementations of the present disclosure, related technologies involved in the implementations of the present disclosure will be explained below.

an NR-U System

An unlicensed spectrum is a spectrum divided by countries and regions that is available for communication of radio devices. The spectrum is generally regarded as a shared spectrum, that is, communication devices in different communication systems may use the spectrum without applying for a proprietary spectrum license from the government as long as they meet regulatory requirements set by the countries or regions on the spectrum. In order to enable various communication systems using the unlicensed spectrum for wireless communication to coexist amicably on this spectrum, the regulatory requirements that must be met for using the unlicensed spectrum have been stipulated in some countries or regions. For example, in European regions, the communication devices follow a listen-before-talk (LBT) principle, that is, before transmitting a signal on a channel of the unlicensed spectrum, the communication devices need to perform channel listening first, and the communication devices can transmit the signal only when a result of channel listening is that the channel is idle. If the result of channel listening performed by the communication devices on the channel of the unlicensed spectrum is that the channel is busy, the communication devices cannot transmit the signal. In order to ensure fairness, in one transmission, a duration in which the communication devices use the channel of the unlicensed spectrum for signal transmission cannot exceed a maximum channel occupation time (MCOT).

SSBs in NR

Common channels and signals such as synchronization signals and broadcast channels in a NR system need to cover the whole cell by way of multi-beam scanning, which facilitates receiving of UEs in the cell. Multi-beam sending of SSBs is implemented by defining an SSB burst set. One SSB burst set contains one or more SSBs. One SSB is used for carrying a synchronization signal and broadcast channel of one beam. Therefore, one SSB burst set may contain SSBs of an SSB number of beams in a cell. A maximum L of the SSB number is related to a frequency band of the system:

for a frequency range below 3 GHZ, L=4;
for a frequency range from 3 GHz to 6 GHz, L=8; and
for a frequency range from 6 GHz to 52.6 GHZ, L=64.

Figure 2:
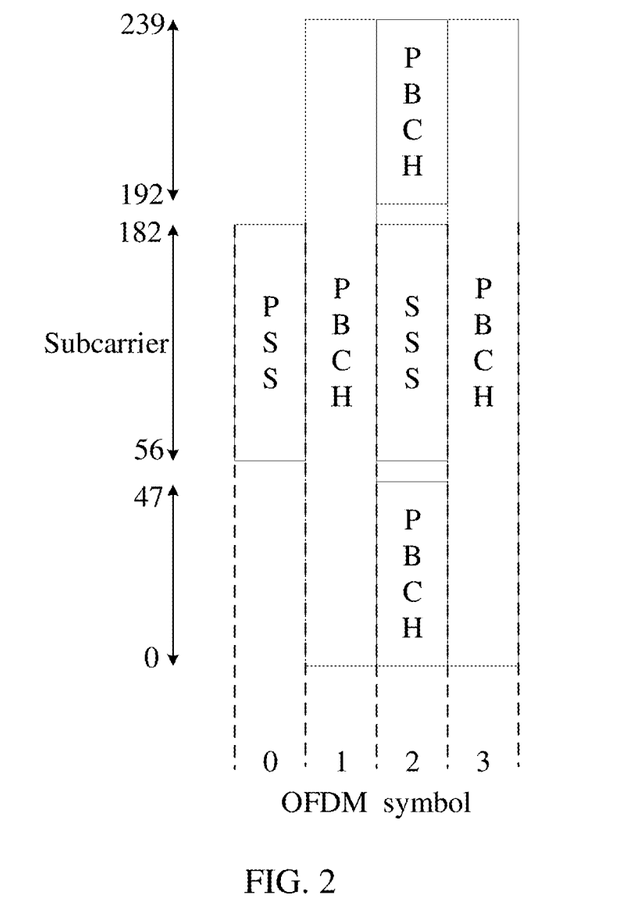
FIG. 2 is a schematic diagram of an SSB in accordance with an implementation of the present disclosure.

The SSB is also referred to as an SS/PBCH block. One SSB contains a primary synchronization signal (PSS) of one symbol, a secondary synchronization signal (SSS) of one symbol, and physical broadcast channels (PBCHs) of two symbols, as shown in FIG. 2. A demodulation reference signal (DMRS) is contained in time frequency resources occupied by the PBCHs for demodulation of the PBCHs.

All SSBs in the SSB burst set are sent within a time window of 5 ms, and are transmitted repeatedly at a certain period configured by a higher layer parameter SSB-timing including 5 ms, 10 ms, 20 ms, 40 ms, 80 ms, 160 ms, etc. For the UE, an index of an SSB is obtained through the received SSB, and corresponds to a relative position of the SSB within the time window of 5 ms. The UE obtains frame synchronization according to this information and half frame indication information carried in a PBCH. The index of the SSB is indicated by a DMRS of the PBCH or information carried by the PBCH.

Figure 3:
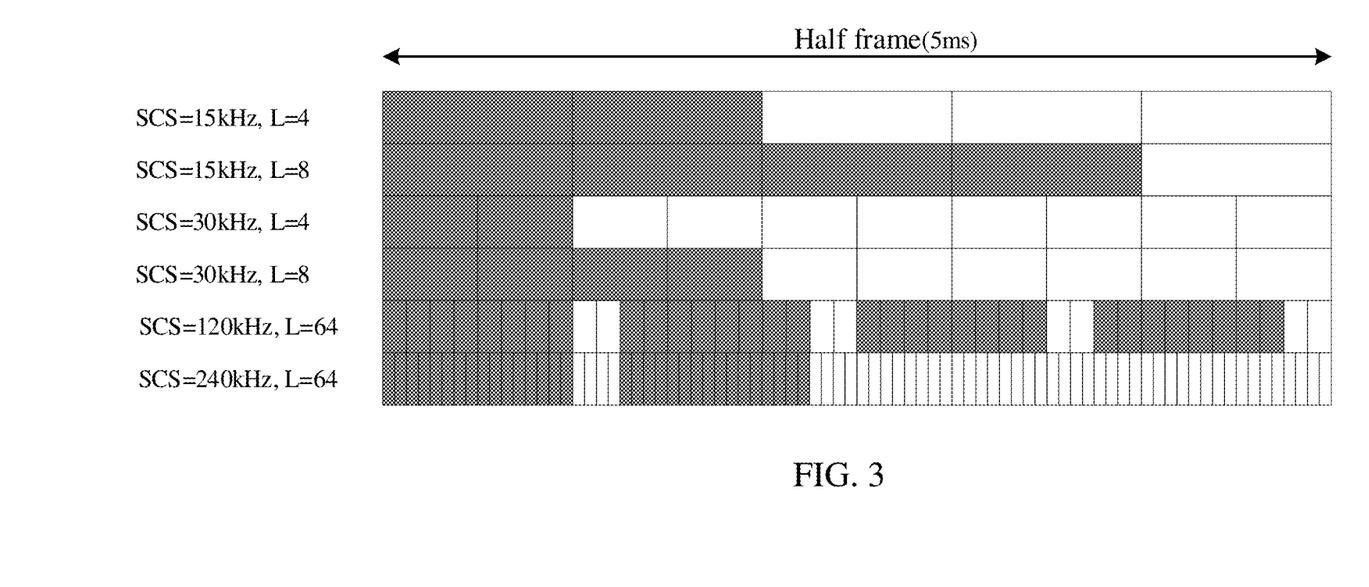
FIG. 3 is a schematic diagram of slot distributions of SSBs in accordance with an implementation of the present disclosure.

Distribution patterns of the SSBs at different subcarrier spacings will be described below, and slot distributions of the SSBs at different subcarrier spacings and in different frequency bands are shown in FIG. 3. Taking a subcarrier spacing of 15 kHz and L=4 as an example, a slot contains 14 symbols and may carry two SSBs. 4 SSBs are distributed in the first two slots within the time window of 5 ms.

L is the maximum number of SSBs sent, and the number of SSBs actually sent may be less than L. Since L is the maximum number of SSBs sent in a certain frequency band, a value range of SSB indexes is [0, L−1]. The SSB index is used for frame synchronization, and is, on the other hand, used for the UE to obtain a QCL relationship of the SSBs. If the indexes of the SSBs received at different times are the same, it is considered that there is the QCL relationship between them. It should be noted that when there is the QCL relationship between two reference signals (such as SSBs), large-scale parameters (such as a doppler delay, an average delay, spatial reception parameters, etc.) of the two reference signals may be considered to be inferred from each other or may be considered to be similar. The UE may perform filtering on the SSBs having the QCL relationship during measurement, as a beam level measurement result.

Discovery Reference Signal (DRS) in a NR-U System

Figure 4:
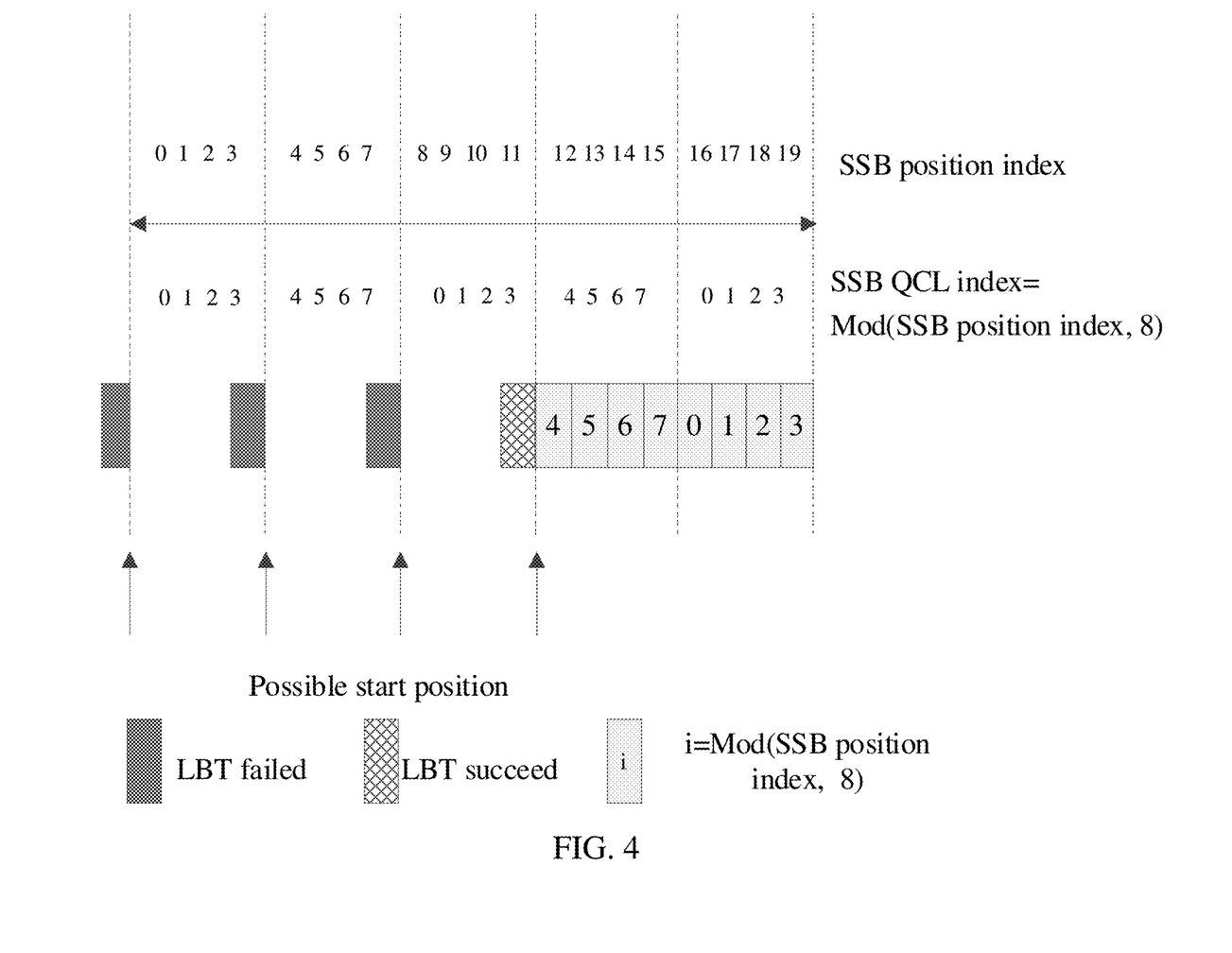
FIG. 4 is a schematic diagram of indexes of SSBs in accordance with an implementation of the present disclosure.

In the NR-U system, for a physical cell (Pcell), a network device sends a DRS for access, measurement, etc. The DRS at least includes an SSB. Considering uncertainty of obtaining a right to use a channel of the unlicensed spectrum, in a sending process of the SSB, since there is a possibility of LBT failure, the SSB may not be successfully sent at a predetermined time point. Therefore, a time window of up to 5 ms is defined in the NR-U, 20 candidate positions are defined for a subcarrier spacing of 30 kHz for the SSB, and 10 candidate positions are defined for a subcarrier spacing of 15 kHz for the SSB. The maximum number of SSBs sent is Q, and a base station determines to use Q candidate positions of the 20/10 candidate positions to transmit the DRS according to a detection result of LBT in the DRS transmission window. As shown in FIG. 4, when the base station successfully performs LBT before a candidate position 12, it is to start to send SSB QCL indexes 0-7. The meaning of the SSB QCL index in the NR-U is different from that of the SSB index in the NR. In the NR, the SSB index may be used to obtain synchronization and the QCL relationship, while in the NR-U, synchronization is obtained by an SSB position index and the QCL relationship is obtained by the SSB QCL index.

Figure 5:
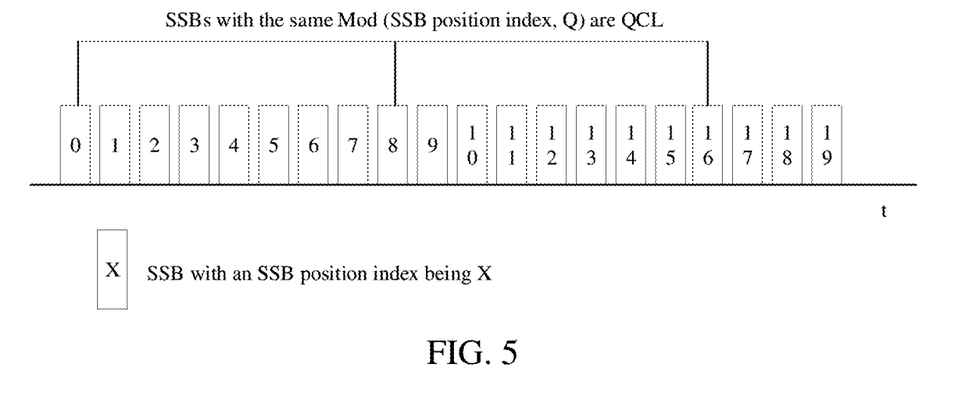
FIG. 5 is a schematic diagram of a QCL relationship in accordance with an implementation of the present disclosure.

According to the time point at which LBT is successful, actual sending position of the SSB may be any of the 20 candidate positions. For a sending mode of the SSB defined in the NR-U, since the UE needs to obtain frame synchronization through the SSB received at the candidate position, the SSB position index needs to be defined for the candidate position. For example, taking Q=8 and Y=20 as an example, since up to 8 SSBs may be sent at the 20 candidate positions, the SSB position indexes carried by the SSBs need to be expanded from 0 to 19, so that the UE can obtain the positions of the received SSBs and further obtain frame synchronization. Since the maximum number of SSBs sent is 8, a value range of the SSB QCL index used to obtain the QCL relationship between the SSBs is 0 to 7. For the SSBs sent at different time points, if their SSB QCL indexes are the same, it is considered that there is a QCL relationship between them. In other words, there is no QCL relationship between the SSBs with different SSB QCL indexes. SSB QCL index=Mod (SSB position index, Q), Mod represents a remainder operation, and a value range of the SSB QCL index is 0 to Q−1. A schematic diagram of the QCL relationship between the SSBs is shown in FIG. 5. The SSBs with SSB position indexes of 0, 8 and 16 have the QCL relationship.

Reference Signal for Link Monitoring and Measurement

In the NR system, the sending and reception of a channel or a signal of the UE have spatial characteristics. For a reference signal related to radio link monitoring (RLM) and measurement, the network side needs to designate a reference signal with a specific beam for the UE, so that the UE can detect the corresponding reference signal to perform RLM, mobility measurement or beam management. Configuration information of the reference signal used for RLM, beam management or the like in the NR standard is as follows.

1) Configuration information of the reference signal for RLM or beam failure detection is shown in table 1 below:

TABLE 1

RadioLinkMonitoringRS ::= SEQUENCE {
radioLinkMonitoringRS-Id RadioLinkMonitoringRS-Id,
purpose ENUMERATED {beamFailure, rlf, both},
detectionResource CHOICE {
ssb-Index SSB-Index,
csi-RS-Index NZP-CSI-RS-ResourceId
},
...
}

In table 1, the SSB-Index is used for indicating an index of an SSB.

2) Indication information of a beam level measurement result based on SSB measurement is shown in Table 2 below:

TABLE 2

ResultsPerSSB-IndexList::= SEQUENCE (SIZE (1..maxNrofIndexesToReport2)) OF ResultsPerSSB-Index
ResultsPerSSB-Index ::= SEQUENCE {
ssb-Index SSB-Index,
ssb-Results MeasQuantityResults OPTIONAL
}

In table 2, the SSB-Index is used for indicating an index of an SSB.

3) After beam failure is discovered, indication information of candidate beams for beam failure recovery (BFR) is shown in Table 3 below.

TABLE 3

BFR-SSB-Resource ::= SEQUENCE {
ssb SSB-Index,
ra-PreambleIndex INTEGER (0..63),
...
}

In table 3, the SSB-Index is used for indicating an index of an SSB.

4) Configuration information of a channel-state information reference signal (CSI-RS) for radio resource management (RRM) measurement is shown in Table 4 below.

TABLE 4

CSI-RS-Resource-Mobility ::= SEQUENCE {
csi-RS-Index CSI-RS-Index,
slotConfig CHOICE {
ms4 INTEGER (0..31),
ms5 INTEGER (0..39),
ms10 INTEGER (0..79),
ms20 INTEGER (0..159),
ms40 INTEGER (0..319)
},
associatedSSB SEQUENCE {
ssb-Index SSB-Index,
isQuasiColocated BOOLEAN
} OPTIONAL, -- Need R
frequency DomainAllocation CHOICE {
row1 BIT STRING (SIZE (4)),
row2 BIT STRING (SIZE (12))
},
firstOFDMSymbolInTimeDomain INTEGER (0..13),
sequenceGenerationConfig INTEGER (0..1023),
...
}

In Table 4, associatedSSB represents SSB information associated with a CSI-RS. The UE needs to detect the associated SSB out first, and then detects the configured CSI-RS. Specifically, the UE determines timing of the CSI-RS according to a cell ID carried in the detected SSB. The SSB-Index is used for indicating an index of an SSB. IsQuasiColocated is used for indicating whether the CSI-RS and the SSB are quasi co-located.

5) Configuration information of an SSB resource set for channel measurement is shown in Table 5 below.

TABLE 5

-- ASN1START
-- TAG-CSI-SSB-RESOURCESET-START
CSI-SSB-ResourceSet ::= SEQUENCE {
csi-SSB-ResourceSetId CSI-SSB-ResourceSetId,
csi-SSB-ResourceList SEQUENCE (SIZE(1..maxNrofCSI- TABLE 5-continued SSB-ResourcePerSet)) OF SSB-Index,
...
}

In Table 5, the SSB-Index is used for indicating an index of an SSB.

In the NR, a reference signal configured by the network side for link monitoring and measurement has beam information. When the reference signal is the SSB, the SSB is identified by an SSB index, which also represents beam information of the SSB. In the NR, the value range of the SSB index is 0 to L−1, and the SSB index is carried in the SSB, and SSBs with different SSB indexes do not have the QCL relationship, i.e., different beams. The QCL relationship of the SSBs can be directly obtained through the SSB indexes. In the NR-U, an SSB position index is carried in an SSB, but the QCL relationship is obtained by the SSB QCL index, which is not directly carried in the SSB, but is calculated through the SSB position index and a parameter Q. In the NR-U, when the SSB is used as the reference signal for link monitoring and measurement, meaning of its identifier, the SSB index, changes, and an SSB index for indicating the SSB needs to be redefined in order to indicate the beam information correctly. Therefore, the following technical schemes of the implementations of the present disclosure are proposed.

Figure 6:
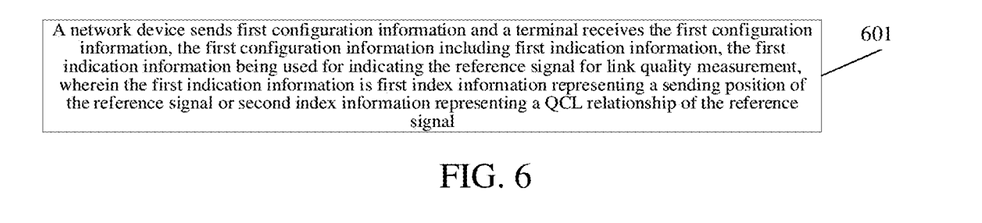
FIG. 6 is a schematic flow chart of a method for indicating a reference signal in accordance with an implementation of the present disclosure.

FIG. 6 is a schematic flow chart of a method for indicating a reference signal in accordance with an implementation of the present disclosure. As shown in FIG. 6, the method for indicating the reference signal includes the following acts.

In act 601, a network device sends first configuration information and a terminal receives the first configuration information, the first configuration information including first indication information, the first indication information being used for indicating a reference signal for link quality measurement, wherein the first indication information is first index information representing a sending position of the reference signal or second index information representing a QCL relationship of the reference signal.

In an implementation of the present disclosure, the network device may be a base station, such as a gNB, an eNB, etc.

In an implementation of the present disclosure, the first configuration information refers to configuration information of a reference signal used for link quality measurement, and the specific implementation of the first configuration information may refer to Tables 1 to 5 shown above.

In an implementation of the present disclosure, the first configuration information includes the first indication information which is used for indicating the reference signal for link quality measurement.

In some optional implementations, the reference signal is an SSB, and the first indication information is the first index information representing a sending position of the reference signal or the second index information representing the QCL relationship of the SSB, which will be described respectively below in conjunction with different implementations of the first indication information.

The first indication information is the first index information representing the sending position of the reference signal; the first index information representing the sending position of the reference signal is used for the terminal to determine the reference signal corresponding to the link quality measurement.

In such case, the terminal determines the reference signal corresponding to the link quality measurement according to the first index information representing the sending position of the reference signal.

Specifically, taking the reference signal being the SSB as an example, the first configuration information includes the first indication information of the SSB, that is, an SSB index. Herein, the SSB index is an index representing the sending position of the SSB, and is called an SSB position index. The terminal determines the SSB corresponding to the link quality measurement according to the index of the sending position of the SSB.

In some optional implementations, a value range of the first index information is determined according to a size of a first transmission window for transmitting the reference signal and/or a subcarrier spacing of the reference signal, that is, the value range of the first index information is related to the size of the first transmission window for transmitting the reference signal and/or the subcarrier spacing of the reference signal.

By way of example, a value range of the SSB position index is related to a size of a DRS window (a window used for transmitting the SSB) and is also related to a subcarrier spacing of the SSB. For example, when the size of the DRS window is 5 ms and the subcarrier spacing of the SSB is 30 kHz, the number of possible sending positions of the SSB is 20, and the value range of the SSB position index representing the sending position of the SSB is 0 to 19.

In some optional implementations, there is a QCL relationship among a plurality of pieces of first index information satisfying a first condition; there is no QCL relationship among a plurality of pieces of first index information that do not satisfy the first condition. Further, the first condition means that results obtained by processing the plurality of pieces of first index information through a first function are the same, and the first function is related to a maximum number of reference signals without the QCL relationship sent in the first transmission window. The first transmission window is used for transmitting the reference signals.

For example, the first function is Mod (SSB position index, Q), wherein Q is the maximum number of SSBs without the QCL relationship sent in the DRS window. There is a QCL relationship between SSB position indexes with the same result obtained through Mod (SSB position index, Q). There is no QCL relationship between SSB position indexes with different results obtained through Mod (SSB position index, Q). On the other hand, the SSB position indexes with the same result obtained by Mod (SSB position index, Q) may belong to a subset, so as to obtain multiple different subsets. There is a QCL relationship between SSB position indexes belonging to the same subset, and there is no QCL relationship between SSB position indexes belonging to different subsets.

In some optional implementations, the link quality measurement is used for at least one of: radio link monitoring (the first configuration information as shown in Table 1), beam failure detection, or channel measurement (the first configuration information as shown in Table 5).

In some optional implementations, the first indication information is further used for indicating at least one of: beam information of a measurement result (the SSB-Index as shown in Table 2), or candidate beam information of beam failure recovery (the SSB-Index as shown in Table 3). Herein, there is an association relationship between the beam information and the reference signal, that is, a beam is indicated by the index information of the reference signal, such as SSB-Indexes as shown in Table 2 and Table 3.

In some optional implementations, the first indication information is further used for indicating reference signal information (such as the SSB-Index as shown in Table 4) associated with a CSI-RS for radio resource management measurement.

The first indication information is the second index information representing the QCL relationship of the reference signal; the second index information representing the QCL relationship of the reference signal is used for the terminal to determine the reference signal corresponding to the link quality measurement.

In such case, the terminal determines the reference signal corresponding to the link quality measurement according to the second index information representing the QCL relationship of the reference signal.

Specifically, taking the reference signal being the SSB as an example, the first configuration information includes the first indication information of the SSB, that is, the SSB index. Herein, the SSB index is an index representing the QCL relationship of the SSB, and is called an SSB QCL index. The terminal determines the SSB corresponding to the link quality measurement according to the index of the QCL relationship of the SSB.

In some optional implementations, a value range of the second index information is determined according to a parameter for determining the QCL relationship of the reference signal, that is, the value range of the second index information is related to the parameter for determining the QCL relationship of the reference signal. Further, the value range of the second index information is related to the maximum number of reference signals without the QCL relationship sent in the first transmission window. The first transmission window is used for transmitting the reference signals.

By way of example, the value range of the SSB QCL index is related to the maximum number Q of SSBs without QCL relationship transmitted in a DRS transmission window. The value range of the SSB QCL index is 0 to Q−1.

In some optional implementations, there is a QCL relationship between the same second index information; and there is no QCL relationship between different second index information.

In some optional implementations, the link quality measurement is used for at least one of: radio link monitoring (the first configuration information as shown in Table 1), beam failure detection, or channel measurement (the first configuration information as shown in Table 5).

In some optional implementations, the first indication information is further used for indicating at least one of: beam information of a measurement result (the SSB-Index as shown in Table 2), or candidate beam information of beam failure recovery (the SSB-Index as shown in Table 3). Herein, there is an association relationship between the beam information and the reference signal, that is, a beam is indicated by the index information of the reference signal, such as SSB-Indexes as shown in Table 2 and Table 3.

In some optional implementations, the first indication information is further used for indicating reference signal information (such as the SSB-Index as shown in Table 4) associated with a CSI-RS for radio resource management measurement.

The above scheme of the implementation of the present disclosure involves two kinds of index information, i.e., the first index information and the second index information. A relationship between the first index information and the second index information is determined according to the maximum number of reference signals without the QCL relationship sent in the first transmission window, that is, the relationship between the first index information and the second index information is related to the maximum number of reference signals without the QCL relationship sent in the first transmission window.

For example, if the first index information is an SSB position index, the second index information is an SSB QCL index, and the maximum number of reference signals without the QCL relationship sent in the first transmission window is Q, then a relationship between the SSB position index and the SSB QCL index is related to the parameter Q. In one example, SSB QCL index=Mod (SSB position index, Q).

Figure 7:
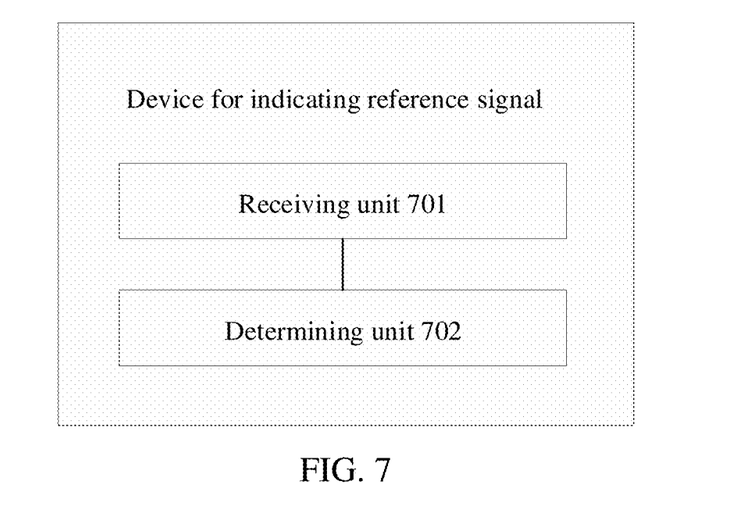
FIG. 7 is a first schematic diagram of a structure of a device for indicating a reference signal in accordance with an implementation of the present disclosure.

FIG. 7 is a first schematic diagram of a structure of a device for indicating a reference signal in accordance with an implementation of the present disclosure. As shown in FIG. 7, the device for indicating the reference signal includes a receiving unit 701.

The receiving unit 701 is configured to receive first configuration information including first indication information, the first indication information being used for indicating a reference signal for link quality measurement, wherein the first indication information is first index information representing a sending position of the reference signal or second index information representing a QCL relationship of the reference signal.

In some optional implementations, the first indication information is the first index information representing the sending position of the reference signal. The device further includes a determining unit 702.

The determining unit 702 is configured to determine the reference signal corresponding to the link quality measurement according to the first index information representing the sending position of the reference signal.

In some optional implementations, a value range of the first index information is determined according to a size of a first transmission window for transmitting the reference signal and/or a subcarrier spacing of the reference signal.

In some optional implementations, there is a QCL relationship among a plurality of pieces of first index information satisfying a first condition; there is no QCL relationship among a plurality of pieces of first index information that do not satisfy the first condition.

In some optional implementations, the first condition means that results obtained by processing the plurality of pieces of first index information through a first function are the same, and the first function is related to a maximum number of reference signals without the QCL relationship sent in the first transmission window. The first transmission window is used for transmitting the reference signals.

In some optional implementations, the first indication information is the second index information representing the QCL relationship of the reference signal. The device further includes a determining unit 702.

The determining unit 702 is configured to determine the reference signal corresponding to the link quality measurement according to the second index information representing the QCL relationship of the reference signal.

In some optional implementations, a value range of the second index information is determined according to a parameter used for determining the QCL relationship of the reference signal.

In some optional implementations, there is a QCL relationship between the same second index information; and there is no QCL relationship between different second index information.

In some optional implementations, a relationship between the first index information and the second index information is determined according to a maximum number of reference signals without the QCL relationship sent in the first transmission window. The first transmission window is used for transmitting the reference signals.

In some optional implementations, the link quality measurement is used for at least one of: radio link monitoring, beam failure detection, or channel measurement.

In some optional implementations, the first indication information is further used for indicating at least one of: beam information of a measurement result, or candidate beam information of beam failure recovery.

In some optional implementations, there is an association relationship between the beam information and the reference signal.

In some optional implementations, the first indication information is further used for indicating reference signal information associated with a CSI-RS for radio resource management measurement.

In some optional implementations, the reference signal is an SSB.

Those skilled in the art should understand that relevant description of the device for indicating the reference signal in accordance with the implementations of the present disclosure may be understood with reference to the relevant description of the method for indicating the reference signal in accordance with the implementations of the present disclosure.

Figure 8:
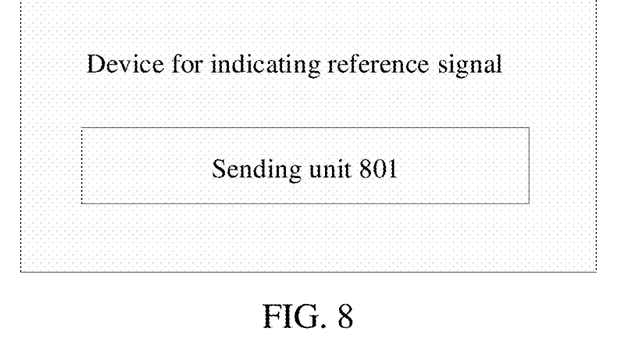
FIG. 8 is a second schematic diagram of a structure of a device for indicating a reference signal in accordance with an implementation of the present disclosure.

FIG. 8 is a second schematic diagram of a structure of a device for indicating a reference signal in accordance with an implementation of the present disclosure. As shown in FIG. 8, the device for indicating the reference signal includes a sending unit 801.

The sending unit 801 is configured to send first configuration information including first indication information, the first indication information being used for indicating the reference signal for link quality measurement, wherein the first indication information is first index information representing a sending position of the reference signal or second index information representing a QCL relationship of the reference signal.

In some optional implementations, the first indication information is the first index information representing the sending position of the reference signal; the first index information representing the sending position of the reference signal is used for a terminal to determine the reference signal corresponding to the link quality measurement.

In some optional implementations, a value range of the first index information is determined according to a size of a first transmission window for transmitting the reference signals and/or a subcarrier spacing of the reference signal.

In some optional implementations, there is a QCL relationship among a plurality of pieces of first index information satisfying a first condition; and there is no QCL relationship among a plurality of pieces of first index information that do not satisfy the first condition.

In some optional implementations, the first condition means that results obtained by processing the plurality of pieces of first index information through a first function are the same, and the first function is related to a maximum number of reference signals without the QCL relationship sent in the first transmission window. The first transmission window is used for transmitting the reference signals.

In some optional implementations, the first indication information is the second index information representing the QCL relationship of the reference signal; and the second index information representing the QCL relationship of the reference signal is used for the terminal to determine the reference signal corresponding to the link quality measurement.

In some optional implementations, a value range of the second index information is determined according to a parameter used for determining the QCL relationship of the reference signal.

In some optional implementations, there is a QCL relationship between the same second index information; and there is no QCL relationship between different second index information.

In some optional implementations, a relationship between the first index information and the second index information is determined according to a maximum number of reference signals without the QCL relationship sent in the first transmission window. The first transmission window is used for transmitting the reference signals.

In some optional implementations, the link quality measurement is used for at least one of: radio link monitoring, beam failure detection, and channel measurement.

In some optional implementations, the first indication information is further used for indicating at least one of: beam information of a measurement result, or candidate beam information of beam failure recovery.

In some optional implementations, there is an association relationship between the beam information and the reference signal.

In some optional implementations, the first indication information is further used for indicating reference signal information associated with a CSI-RS for radio resource management measurement.

In some optional implementations, the reference signal is an SSB.

Those skilled in the art should understand that the relevant description of the device for indicating the reference signal in accordance with the implementations of the present disclosure may be understood with reference to the relevant description of the method for indicating the reference signal in accordance with the implementations of the present disclosure.

Figure 9:
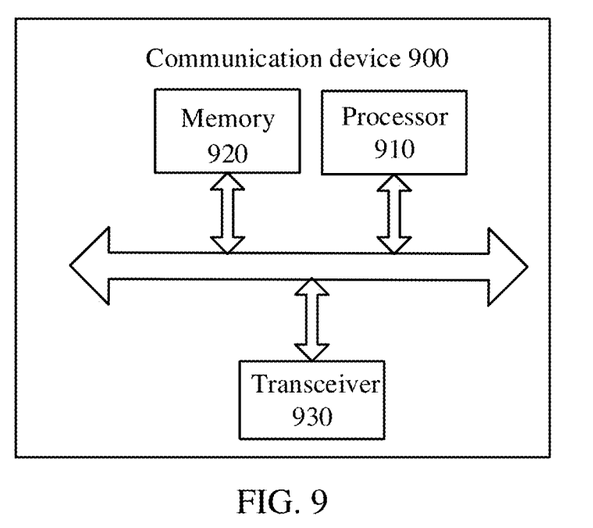
FIG. 9 is a schematic diagram of a structure of a communication device 900 in accordance with an implementation of the present disclosure.

FIG. 9 is a schematic diagram of a structure of a communication device 900 in accordance with an implementation of the present disclosure. The communication device may be a terminal or a network device. The communication device 900 shown in FIG. 9 includes a processor 910, which may invoke and run a computer program from a memory to implement the methods in accordance with the implementations of the present disclosure.

Optionally, as shown in FIG. 9, the communication device 900 may further include a memory 920. The processor 910 may invoke and run the computer program from the memory 920 to implement the methods in accordance with the implementations of the present disclosure.

The memory 920 may be a separate device independent of the processor 910, or may be integrated in the processor 910.

Optionally, as shown in FIG. 9, the communication device 900 may further include a transceiver 930. The processor 910 may control the transceiver 930 to communicate with other devices. Specifically, the transceiver 930 may send information or data to other devices or receive information or data sent by other devices.

The transceiver 930 may include a transmitter and a receiver. The transceiver 930 may further include antennas, the number of which may be one or more.

Optionally, the communication device 900 may specifically be the network device in the implementations of the present disclosure, and the communication device 900 may implement the corresponding processes implemented by the network device in various methods in accordance with the implementations of the present disclosure, which will not be repeated herein for brevity.

Optionally, the communication device 900 may specifically be the mobile terminal/terminal in the implementations of the present disclosure, and the communication device 900 may implement the corresponding processes implemented by the mobile terminal/terminal in various methods in accordance with the implementations of the present disclosure, which will not be repeated herein for brevity.

Figure 10:
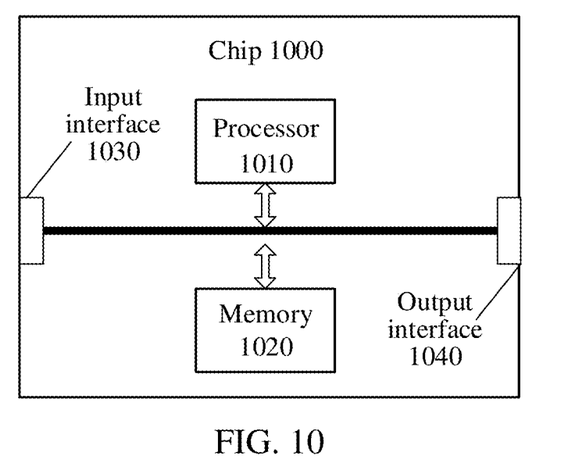
FIG. 10 is a schematic diagram of a structure of a chip in accordance with an implementation of the present disclosure.

FIG. 10 is a schematic diagram of a structure of a chip in accordance with an implementation of the present disclosure. The chip 1000 shown in FIG. 10 includes a processor 1010. The processor 1010 may invoke and run a computer program from a memory to implement the methods in accordance with the implementations of the present disclosure.

Optionally, as shown in FIG. 10, the chip 1000 may further include a memory 1020. The processor 1010 may invoke and run the computer program from the memory 1020 to implement the methods in accordance with the implementations of the present disclosure.

The memory 1020 may be a separate device independent of the processor 1010, or may be integrated in the processor 1010.

Optionally, the chip 1000 may further include an input interface 1030. The processor 1010 may control the input interface 1030 to communicate with other devices or chips. Specifically, the processor 1010 may acquire information or data sent by other devices or chips.

Optionally, the chip 1000 may further include an output interface 1040. The processor 1010 may control the output interface 1040 to communicate with other devices or chips. Specifically, the processor 1010 may output information or data to other devices or chips.

Optionally, the chip may be applied to the network device in the implementations of the present disclosure, and the chip may implement the corresponding processes implemented by the network device in various methods in accordance with the implementations of the present disclosure, which will not be repeated herein for brevity.

Optionally, the chip may be applied to the mobile terminal/terminal in the implementations of the present disclosure, and the chip may implement the corresponding processes implemented by the mobile terminal/terminal in various methods in accordance with the implementations of the present disclosure, which will not be repeated herein for brevity.

It should be understood that the chip mentioned in the implementations of the present disclosure may be referred to as a system-level chip, a system chip, a chip system or a system-on-chip, etc.

Figure 11:
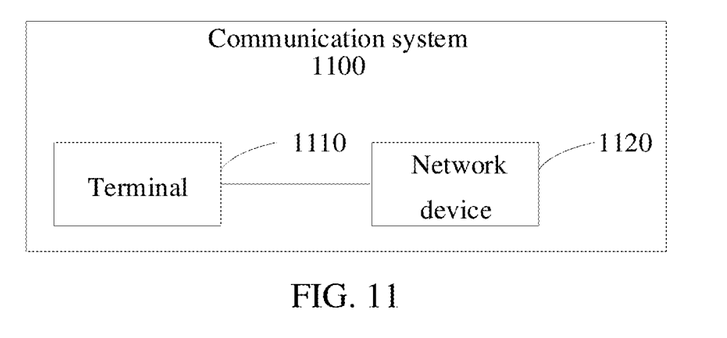
FIG. 11 is a schematic block diagram of a communication system 1100 in accordance with an implementation of the present disclosure.

FIG. 11 is a schematic block diagram of a communication system 1100 in accordance with an implementation of the present disclosure. As shown in FIG. 11, the communication system 1100 may include a terminal 1110 and a network device 1120.

Herein, the terminal 1110 may be configured to implement the corresponding functions implemented by the terminal in the above methods, and the network device 1120 may be configured to implement the corresponding functions implemented by the network device in the above methods, which will not be repeated herein for brevity.

It should be understood that the processor in the implementations of the present disclosure may be an integrated circuit chip having a signal processing capability. In an implementation process, various acts of the foregoing method implementations may be completed through an integrated logic circuit of hardware in the processor or instructions in the form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may be any conventional processor, or the like. The acts of the methods disclosed in the implementations of the present disclosure may be directly embodied to be completed by a hardware decoding processor, or may be completed by a combination of hardware in the decoding processor and software modules. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

An implementation of the present disclosure further provides a computer-readable storage medium configured to store a computer program.

Optionally, the computer-readable storage medium may be applied to the network device in the implementations of the present disclosure, and the computer program enables a computer to perform the corresponding processes implemented by the network device in various methods of the implementations of the present disclosure, which will not be repeated herein for brevity.

Optionally, the computer-readable storage medium may be applied to the mobile terminal/terminal in the implementations of the present disclosure, and the computer program enables a computer to perform the corresponding processes implemented by the mobile terminal/terminal in various methods of the implementations of the present disclosure, which will not be repeated herein for brevity.

An implementation of the present disclosure further provides a computer program product including computer program instructions.

Optionally, the computer program product may be applied to the network device in the implementations of the present disclosure, and the computer program instructions enable a computer to perform the corresponding processes implemented by the network device in various methods of the implementations of the present disclosure, which will not be repeated herein for brevity.

Optionally, the computer program product may be applied to the mobile terminal/terminal in the implementations of the present disclosure, and the computer program instructions enable a computer to perform the corresponding processes implemented by the mobile terminal/terminal in various methods of the implementations of the present disclosure, which will not be repeated herein for brevity.

An implementation of the present disclosure further provides a computer program.

Optionally, the computer program may be applied to the network device in the implementations of the present disclosure, and the computer program, when running on a computer, enables the computer to perform the corresponding processes implemented by the network device in various methods of the implementations of the present disclosure, which will not be repeated herein for brevity.

Optionally, the computer program may be applied to the mobile terminal/terminal in the implementations of the present disclosure, and the computer program, when running on a computer, enables the computer to perform the corresponding processes implemented by the mobile terminal/terminal in various methods of the implementations of the present disclosure, which will not be repeated herein for brevity.

A person of ordinary skill in the art may recognize that the elements and algorithm acts in various examples described in combination with the implementations disclosed herein may be implemented in electronic hardware, or a combination of computer software and electronic hardware. Whether these functions are implemented in hardware or software depends on the specific applications and design constraints of the technical scheme. Skilled artisans may use different methods to implement the described functions for each particular application, but such an implementation should not be considered to be beyond the scope of the present disclosure.

Those skilled in the art may clearly understand that for the sake of convenience and conciseness of description, the specific working processes of the systems, devices and units described above may refer to the corresponding processes in the above method implementations, and will not be repeated herein.

In several implementations provided by the present invention, it should be understood that the disclosed systems, devices and methods may be implemented in other ways. For example, the device implementations described above are only illustrative, for example, the division of the units is only a logical function division, and there may be other division manners in actual implementations. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the schemes of the implementations.

In addition, various functional units in various implementations of the present disclosure may be integrated into one processing unit, or each functional unit may exist physically and separately, or two or more than two units may be integrated into one unit.

The function, if implemented in the form of a software functional unit and sold or used as an independent product, may be stored in a computer-readable storage medium. Based on such understanding, the technical scheme of the present disclosure, in essence, or the part contributing to the prior art, or part of the technical scheme, may be embodied in the form of a software product, which is stored in a storage medium and includes multiple instructions for enabling a computer device (which may be a personal computer, a server, or a network device, etc.) to perform all or part of the acts of the methods in the implementations of the present disclosure. The aforementioned storage medium includes various media which are capable of storing program codes, such as a U disk, a mobile hard disk, a read-only memory (ROM), a random access memory (RAM), a magnetic disk, or an optical disk.

What are described above are merely specific implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

I claim:

1. A method for indicating a reference signal of New Radio Unlicensed, comprising:
   receiving, by a terminal, first configuration information, wherein the first configuration information comprises first indication information, the first indication information being used for indicating a reference signal for link quality measurement; wherein the first indication information comprises second index information representing a quasi-co-located (QCL) relationship of the reference signal;
   wherein the first indication information further comprises first index information representing a sending position of the reference signal; wherein a relationship between the first index information and the second index information is determined according to a maximum number of reference signals without the QCL relationship sent in the first transmission window, wherein the first transmission window is used for transmitting the reference signals.

2. The method according to claim 1, wherein the first indication information is the second index information representing the QCL relationship of the reference signal; the method further comprises:
   determining, by the terminal, the reference signal corresponding to the link quality measurement according to the second index information representing the QCL relationship of the reference signal.

3. The method according to claim 2, wherein a value range of the second index information is determined according to a parameter used for determining the QCL relationship of the reference signal.

4. The method according to claim 2, wherein there is a QCL relationship between same second index information; and there is no QCL relationship between different second index information.

5. The method according to claim 1, wherein the link quality measurement is used for at least one of: radio link monitoring, beam failure detection, or channel measurement.

6. The method according to claim 1, wherein the reference signal is a synchronization signal block (SSB).

7. A method for indicating a reference signal of New Radio Unlicensed, comprising:
sending, by a network device, first configuration information, wherein the first configuration information comprises first indication information, the first indication information being used for indicating a reference signal for link quality measurement; wherein the first indication information comprises second index information representing a quasi-co-located (QCL) relationship of the reference signal;
wherein the first indication information further comprises first index information representing a sending position of the reference signal; wherein a relationship between the first index information and the second index information is determined according to a maximum number of reference signals without the QCL relationship sent in the first transmission window, wherein the first transmission window is used for transmitting the reference signals.

8. The method according to claim 7, wherein the first indication information is the second index information representing the QCL relationship of the reference signal; and
the second index information representing the QCL relationship of the reference signal is used for the terminal to determine the reference signal corresponding to the link quality measurement.

9. The method according to claim 8, wherein a value range of the second index information is determined according to a parameter used for determining the QCL relationship of the reference signal.

10. A device for indicating a reference signal of New Radio Unlicensed, comprising a processor and a transceiver, wherein
the transceiver is configured to receive first configuration information, wherein the first configuration information comprises first indication information, the first indication information being used for indicating a reference signal for link quality measurement; wherein the first indication information comprises second index information representing a quasi-co-located (QCL) relationship of the reference signal;
wherein the first indication information further comprises first index information representing a sending position of the reference signal; wherein a relationship between the first index information and the second index information is determined according to a maximum number of reference signals without the QCL relationship sent in the first transmission window, wherein the first transmission window is used for transmitting the reference signals.

11. The device according to claim 10, wherein the first indication information is the second index information representing the QCL relationship of the reference signal; and the device further comprises:
the processor is configured to determine the reference signal corresponding to the link quality measurement according to the second index information representing the QCL relationship of the reference signal.

12. The device according to claim 11, wherein a value range of the second index information is determined according to a parameter used for determining the QCL relationship of the reference signal.

13. The device according to claim 11, wherein there is a QCL relationship between same second index information; and there is no QCL relationship between different second index information.

14. The device according to claim 10, wherein the link quality measurement is used for at least one of: radio link monitoring, beam failure detection, or channel measurement.

15. A device for indicating a reference signal of New Radio Unlicensed, comprising a processor and a transceiver, wherein
the transceiver is configured to send first configuration information, wherein the first configuration information comprises first indication information, the first indication information being used for indicating a reference signal for link quality measurement; wherein the first indication information comprises second index information representing a quasi-co-located (QCL) relationship of the reference signal;
wherein the first indication information further comprises first index information representing a sending position of the reference signal; wherein a relationship between the first index information and the second index information is determined according to a maximum number of reference signals without the QCL relationship sent in the first transmission window, wherein the first transmission window is used for transmitting the reference signals.

16. The device according to claim 15, wherein the first indication information is the second index information representing the QCL relationship of the reference signal; and
the second index information representing the QCL relationship of the reference signal is used for a terminal to determine the reference signal corresponding to the link quality measurement.

17. The device according to claim 16, wherein a value range of the second index information is determined according to a parameter used for determining the QCL relationship of the reference signal.

* * * * *